United States Patent [19]
Doerr et al.

[11] 3,966,261
[45] June 29, 1976

[54] COAL SLURRY RECOVERY SYSTEMS

[75] Inventors: Richard E. Doerr; David L. McCain, both of Ponca City, Okla.; David H. Davis, Fairmont, W. Va.

[73] Assignee: Continental Oil Company, Ponca City, Okla.

[22] Filed: June 30, 1975

[21] Appl. No.: 591,269

[52] U.S. Cl. .................................... 302/14; 299/19; 302/15; 302/56
[51] Int. Cl.² .......................................... B65G 53/30
[58] Field of Search .............................. 302/14–16, 302/49, 56; 299/7, 8, 18, 19, 64

[56] References Cited
UNITED STATES PATENTS

| | | | |
|---|---|---|---|
| 3,244,455 | 4/1966 | Condolios | 302/14 |
| 3,260,548 | 7/1966 | Reichl | 299/64 |
| 3,269,777 | 8/1966 | MacLellan | 302/14 |
| 3,371,965 | 3/1968 | MacLellan | 302/14 |
| 3,790,214 | 2/1974 | Kilroy | 302/14 |

Primary Examiner—Evon C. Blunk
Assistant Examiner—Jeffrey V. Nase
Attorney, Agent, or Firm—William J. Miller

[57] ABSTRACT

Improvement structure for use in mine slurry conveyor systems of the type which transport mined material from a plurality of work spaces in the mine to a remotely disposed recovery and finishing plant. The system utilizes permanent tank or silo storage of slurry and water at a centralized point within a mine for reception of material slurry from all work faces in order to re-regulate slurry concentration for further conveyance out of the mine to a recovery station. The slurry silo communicates with a positive solids feed device which deposits mined material into a submerged slurry pit for re-slurry mixing at controlled rate of positive solids feed and agitation of re-slurry water whereupon the adjusted slurry is hydraulically conveyed to the recovery station.

9 Claims, 3 Drawing Figures

COAL SLURRY RECOVERY SYSTEMS

BACKGROUND OF THE INVENTION

1. Field of the Invention

The invention relates generally to mined material conveyance systems and, more particularly, but not by way of limitation, it relates to an improved slurry transportation system for movement of coal from plural mine or work faces to a remote recovery station.

2. Description of the Prior Art

While various of the prior art teachings are directed to the use of slurry transportation lines within a coal mine, there is no teaching known to the present inventors which is directed to slurry adjustment systems as utilized with a plurality of mine work face slurry sources such as proposed herein. The prior art patent in the name of MacLellan, U.S. Pat. No. 3,269,777, issued on Aug. 30, 1966, should be recognized; however, the MacLellan teaching only relates to the use of a shallow sump formed within a mine passageway for the purpose of water concentration. A separate form of storage tank is utilized in the mine for concentration of particulate slurry, and it is wholly separate from the water storage sump as necessitated by the exigencies of a hydraulic hoisting system.

SUMMARY OF THE INVENTION

The present invention relates to a system for effecting regulated re-slurry of a plurality of particulate material slurry inputs as derived from plural work faces in and about a mine area. The system utilizes large volume silos for continual and regulated storage of both water and slurry with positive feed metering of particulate material from the slurry silo into a re-slurry sump whereupon slurry concentration is readjusted for pump conveyance to a remote recovery station.

Therefore, it is an object of the present invention to provide a storage and recovery system for coarse coal slurry which is improved to include a positive solids feed.

It is also an object of the invention to provide a system which enables concentration adjustment of a plurality of particulate material slurry inputs for subsequent conduit conveyance to a remote recovery point.

Finally, it is an object of the present invention to provide a slurry system capable of delivering coal slurry from multiple mine faces to a slurry and water storage position whereupon the mined material is reslurried for hydraulic transportation to a recovery point while system water is stored and re-circulated as required at the various mine faces.

Other objects and advantages of the invention will be evident from the following detailed description when read in conjunction with the accompanying drawings which illustrate the invention.

DETAILED DESCRIPTION OF THE PREFERRED EMBODIMENT

Figure 1:
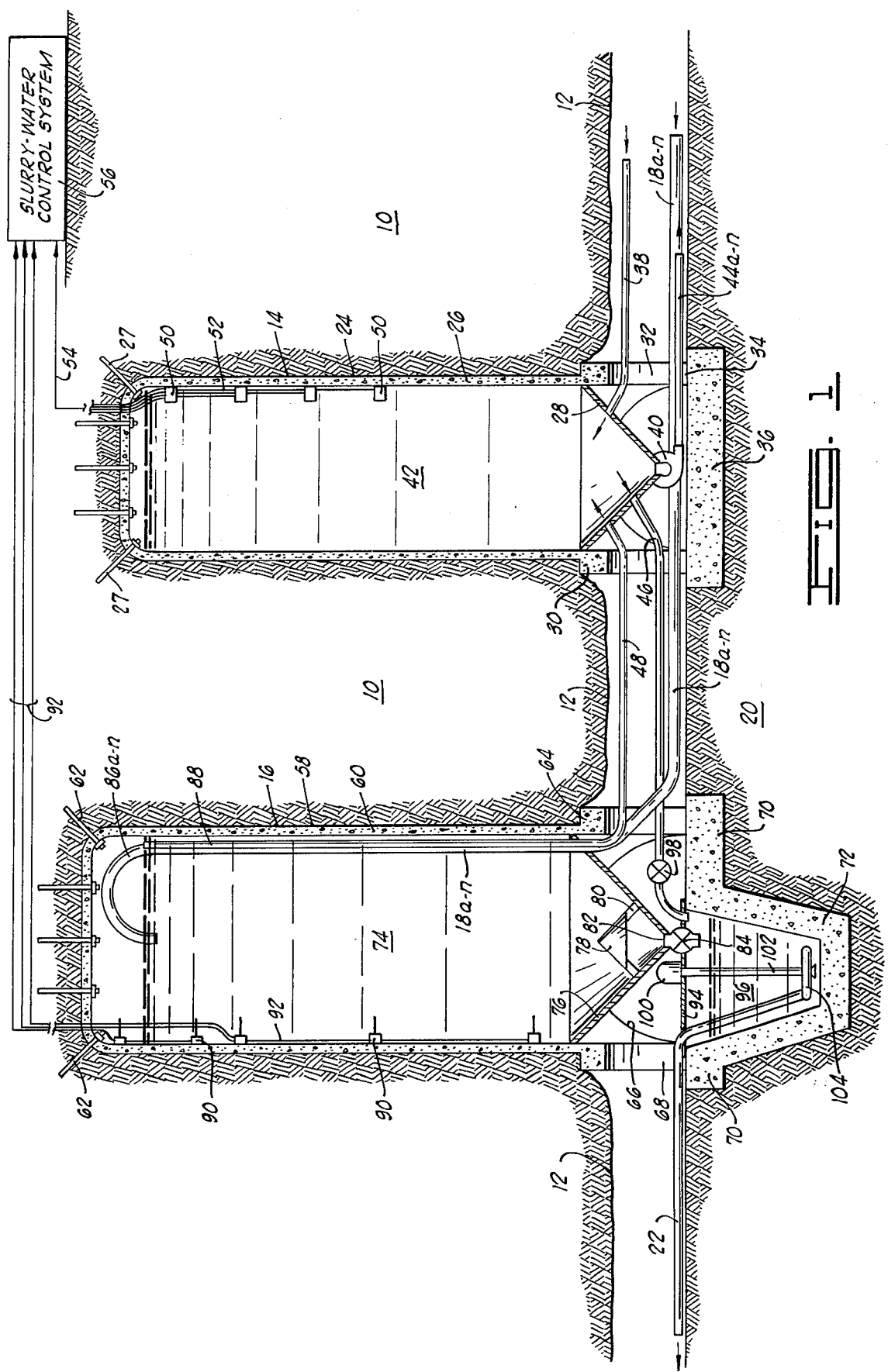
FIG. 1 is a schematic illustration in vertical section of a mine section constructed and operated in accordance with the present invention.

The problems inherent with slurry handling systems wherein a plurality of slurry input lines are combined for pumping conveyance through a single slurry line have been met variously and the solutions constitute the subject matter of co-pending patent applications of the present assignee. In particular, related multiple mine face teachings are U.S. Pat. application Ser. No. 461,034 filed Apr. 15, 1974 and entitled "Shallow Underground Coal Slurry Concentration Sump"; patent application Ser. No. 461,035, now U.S. Pat. No. 3,870,373, filed Apr. 15, 1974 and entitled "Underground Coal Slurry Concentrating Sump"; and patent application Ser. No. 463,325 filed Apr. 23, 1974 and entitled "Improved Slurry Handling System".

In like manner, the present system may be installed in a selected earth section 10 wherein mine passageways 12 are formed in conventional mining fashion, either by room and pillar or certain long wall mining operations. A water silo 14 and slurry silo 16 are disposed in reasonably close, co-actionable relationship at a selected point in the mine whereupon slurried particulate material, coal, ore or the like, is delivered in from the mine work faces via a plurality of slurry conduits 18a–n to the re-slurry site 20 for adjustment of total slurry concentration and subsequent pumping via slurry conduit 22 to a more remotely located recovery point or final processing and finishing station. In some cases, depending upon the mine layout, the slurry conduit 22 may lead to vertical hoisting pumps which deliver the slurried material to the surface for further finishing operations.

The water storage silo 14 may be formed in one manner by raised-drilling within the mine roof to form an earth wall 24 of selected volume with subsequent formation of concrete liner 26. The concrete liner 26 may be formed by conventional slip-cast methods with a plurality of roof bolt hangers 27 supporting the upper end. A steel conical bottom 28 of complementary diameter is then hung in place as maintained in sealed engagement by means of such as a concrete support pedestal 30 formed across the mine passageway 12. The pedestal 30 is preferably formed with a plurality of arched passageways 32 maintaining the mine passages open with the bottom or pedestal legs 34 supported by a horizontal concrete slab 36 formed with sufficient footing of designated thickness. In present application, it is proposed that water storage silo 14 be fifteen feet in diameter with one hundred foot height having a volume of 17,070 cubic feet or capacity for 132,500 gallons of water. In such structure the concrete liner 26 is designated as eight inches in thickness.

Input water from a primary reservoir source is input to storage silo 14 via conduit 38 which may lead to any high volume source within the mine, a surface water source or the like. A water pump 40, also of conventional high volume type, may be controlled to move water from silo interior 42 via one or more water return conduits 44a–n to the respective mine faces for slurrying at the respective mining machines and return of slurried matter via conduits 18a–n.

Re-slurry water is removed from interior 14 via conduit 46 while recovered water from slurry storage silo 16 enters via conduit 48. The water level within water silo 14 is continually controlled by means of a plurality of multi-level water sensors 50 suitably disposed along the interior of liner 26 as interconnected by means of control cables 52 and cable 54 leading to the slurry-water control system 56 which is suitably disposed at a convenient location. The control system 56 may be located on surface or at a strategic mine tunnel location or both with suitable override controls. The specifics of such automatic control in the slurrying process are more particularly disclosed in the aforementioned U.S. Pat. application Ser. No. 463,325 "Improved Slurry Handling System".

The slurry storage silo 16 is constructed similar to the water storage silo 14 as it is formed within a raised-drilled earth wall 58 and includes a slip-cast concrete liner 60 as supported by a plurality of roof bolt hangers 62. The lower perimeter of liner 60 is further supported on an arched pedestal 64 having plural arch passages 66 with the quadrature-arrayed pedestal feet 68 supported on concrete base portion 70 which is unitarily formed to define a slurry sump 72 of predetermined size and depth. Presently, the slurry storage silo 16 is specified at 18.5 feet in diameter and 140 feet in height to define an interior 74 of 37,630 cubic feet or having a capacity of 282,300 gallons. This capacity is the equivalent of approximately 925 tons of coal.

A steel conical bottom 76 is sealingly disposed about the bottom of liner 60 and includes a flow direction cone formation 78 as supported by a plurality of heavy gauge steel support plates 80 which maintain cone 78 in axial alignment with a bottom flow outlet 82 as connected through a metering gate, i.e. rotary gate feed valve 84, as will be further described.

Slurry input to interior 74 is via slurry conduits 182–n which are sealingly led through conical bottom 76 and up for downward release by means of U-shaped conduit necks 86a–n. Overflow of water is then led down through overflow portion 88 of return conduit 48 where water is resupplied into interior 42 of the water storage silo 14. A plurality of slurry level sensors 90 of conventional type are suitably affixed on the liner wall and interconnected by means of a plurality of control cables 92 as led up to the slurrywater control system 56. Conventional pipe hangers cast into the wall of liner 60 provide support for the water overflow conduit 88 and the one or more slurry input conduits 18a–n.

A cover plate 94 is disposed over interior 96 of sump 72 as supported and suitably anchored on base portions 70 thereof. The rotary gate feeder 84 is then supported through cover plate 94 in order to meter increased concentration slurry down into interior 96 whereupon re-slurry water via conduit 46 from water storage silo 14 is applied through a control valve 98 for entry into sump volume 96 in order to adjust the slurry concentration for optimum pumping capability via exit slurry conduit 22. A slurry pump 100 supported on cover plate 94 then operates through a rotor shaft 102 to drive the large capacity slurry pump 104 thereby to effect exit slurry flow via conduit 22.

In operation, slurry entering storage silo 16 via slurry conduits 18a–n will rapidly settle to the bottom of interior 74 while slurry water accumulates in the upper portion thereof. The coal or other particulate material is then metered out at a desired rate by means of the rotary vane feeder 84 such that the coal is dropped directly into the slurry sump interior 96 for processing through the hoisting pump 104 upon addition of re-slurry water via valve 98 at desired coal per water ratio. The final slurry concentration within sump enclosure 96 is adjusted both by provision of variable feed drive to rotary vane feeder 84 and adjustment of re-slurry water via control valve 98, both of which may be automatically adjusted by conventional sensing and electrical control methods.

In addition to the rotary vane feeder 84, such as a roll-type feeder may also be utilized and the roll feeder has the particular capability of very accurate proportioning with relatively large through capacity. Present design of the rotary vane feeder 84 includes a quadrature array of vanes to provide a continuous uniform feed susceptible of rapid and accurate adjustment through variation of rotational speed. such high capacity metering or feeder valves are well-known and commercially available within the coal mining technology.

Figure 2:
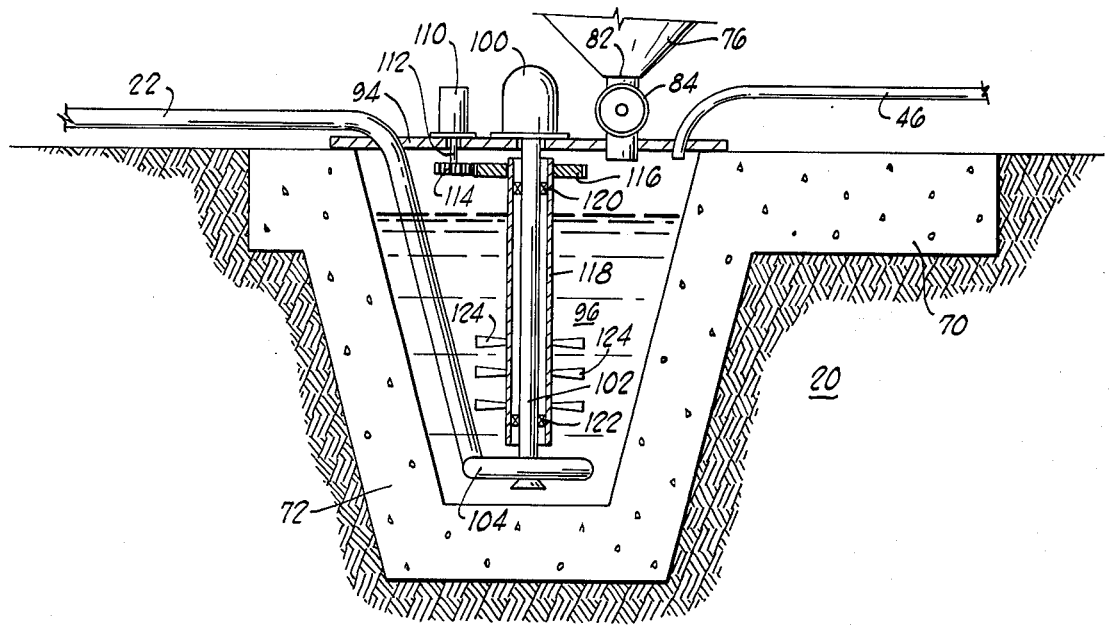
FIG. 2 illustrates an enlarged portion of the FIG. 1 showing which includes alternative structure for agitation within a sump pit.

FIG. 2 illustrates a portion of FIG. 1, particularly the slurry sump 72, which includes an alternative form of structure that provides continual agitation of the reproportioned sump mixture within sump enclosure 96. Thus, an additional prime mover or motor 110 is mounted on cover plate 94 to provide rotational input on a shaft 112 to a drive gear 114. Drive gear 114 then provides transmission of rotational force to a gear 116 which is suitably secured as by welding around the upper periphery of a rotor cylinder 118 as rotationally supported by conventional bearings 120 and 122 on the rotor shaft 102. The rotor cylinder 118 carries a plurality of circumferentially spaced vanes or paddles 124 about the lower extremity, and energization of motor 110 with transmission of rotation to rotor cylinder 118 provides continual agitation of paddles 124 in order to maintain continuously the mix and proportioning of slurry about the slurry pump 104 at the intake position.

Figure 3:
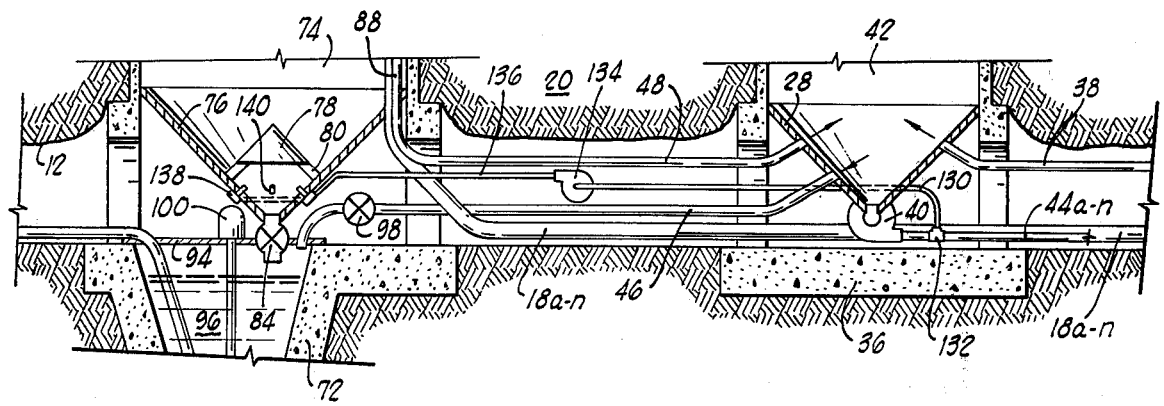
FIG. 3 discloses yet another alternative structure which may be utilized in the present invention.

Yet another alternative structure is illustrated in the enlarged view of FIG. 3. This structure provides for injection of additional re-slurry water for jet mixing at the outlet of slurry silo interior 74 or just prior to passage through rotary vane feeder 84. Water supply is taken via a conduit 130 from a suitable nearby source, e.g., a T-connector 132 in a selected one of water conduits 44a–n. The conduit 130 is then led to a water pump 134 which provides output of water at selected pressure via a conduit 136 to a water input ring 138. Input ring 138 is suitably supported about the underside of conical bottom 76 to extend a plurality of jet nozzles 140 therethrough. Thus, the more concentrated coal or other particulate material settling down below cone formation 78 receives input of re-slurry water under relatively high pressure to provide an initial proportioning of slurry prior to metering through rotary vane feeder 84 into sump interior 96. Pump 134 is adjusted to provide the desired preproportioning pressure beneath cone 78, and final proportioning of the slurry mixture is adjusted in accordance with valve 98 in re-slurry water line 46 in order to provide optimum slurry composition for pickup and further transmission by slurry pump 104 (FIG. 1).

The foregoing discloses an improved coal slurry transmission system which enables continual central slurry concentration adjustment of slurry input from a plurality of mine faces such that optimum movement of the slurry may proceed to the next stage or recovery position in or about the mine. The present system enables re-slurry proportioning of slurried coal from all mine faces by utilization of structure providing positive solids feed and accurate re-proportioning in a storage and pumping sump for further, larger capacity transmission.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. An improved slurry handling system for centralized re-proportioning of slurried particulate material at a centralized mine tunnel location, comprising:
    a water storage enclosure and means for conducting water to at least one mine tunnel work face;
    a slurry storage enclosure and means for receiving slurried material from at least one mine tunnel work face, said slurry enclosure having the lower extremity formed to provide a slurry outlet;
    slurry sump enclosure means disposed in said mine tunnel at said slurry storage enclosure and slurry outlet;
    metering valve means connected to receive particulate material from said slurry outlet to provide positive metering of material into said slurry sump enclosure means;
    conduit means including flow control valve for conducting water from said water enclosure means for input as re-slurry water to said slurry sump enclosure means; and
    slurry pump means and exit slurry line for moving slurry out of said sump enclosure means via said exit slurry line.

2. A system as set forth in claim 1 wherein said metering valve means comprises a
    rotary vane feeder means connected to said slurry outlet.

3. A system as set forth in claim 1 wherein said slurry storage enclosure comprises:
    a concrete enclosure of selected cross-sectional area formed up within a selected mine tunnel roof; and
    bottom enclosure means having one end of similar cross-sectional area sealingly connected below said concrete enclosure and having the opposite end terminating in reduced cross-sectional area at said slurry outlet.

4. A system as set forth in claim 3 which is further characterized to include:
    means for effecting conical flow direction secured centrally axially within said bottom enclosure means over said slurry outlet.

5. A system as set forth in claim 4 which is further characterized to include:
    water conduit means conducting water at controllable rate from said water storage enclosure; and
    a plurality of jet nozzles each receiving water from said water conduit means and each being secured to direct a water stream through said bottom enclosure means into the area beneath said conical flow direction means.

6. A system as set forth in claim 3 wherein said concrete enclosure is cylindrical and said bottom enclosure means is conical.

7. A system as set forth in claim 1 wherein said water storage enclosure comprises:
    a cylindrical concrete enclosure formed up within a selected mine tunnel roof;
    conical enclosure means opening upward and sealingly connected below said concrete enclosure; and
    pump means connected at the bottom of said conical enclosure means and communicating with the interior of said water storage enclosure to conduct water via said means for conducting water to at least one mine tunnel work face.

8. A system as set forth in claim 1 which is further characterized to include:
    agitator means supported over said slurry sump enclosure means; and
    means for driving said agitator means to provide continuous mixing of reslurried material in said slurry sump enclosure means.

9. A system as set forth in claim 1 which is further characterized to include:
    overflow conduit means disposed within said slurry storage enclosure to conduct excess water for input to said water storage enclosure.

* * * * *